July 28, 1931.  J. CLARK ET AL  1,816,421
WROUGHT METAL REPAIR DEVICE FOR PIPE LINES
Filed April 24, 1928   3 Sheets-Sheet 1
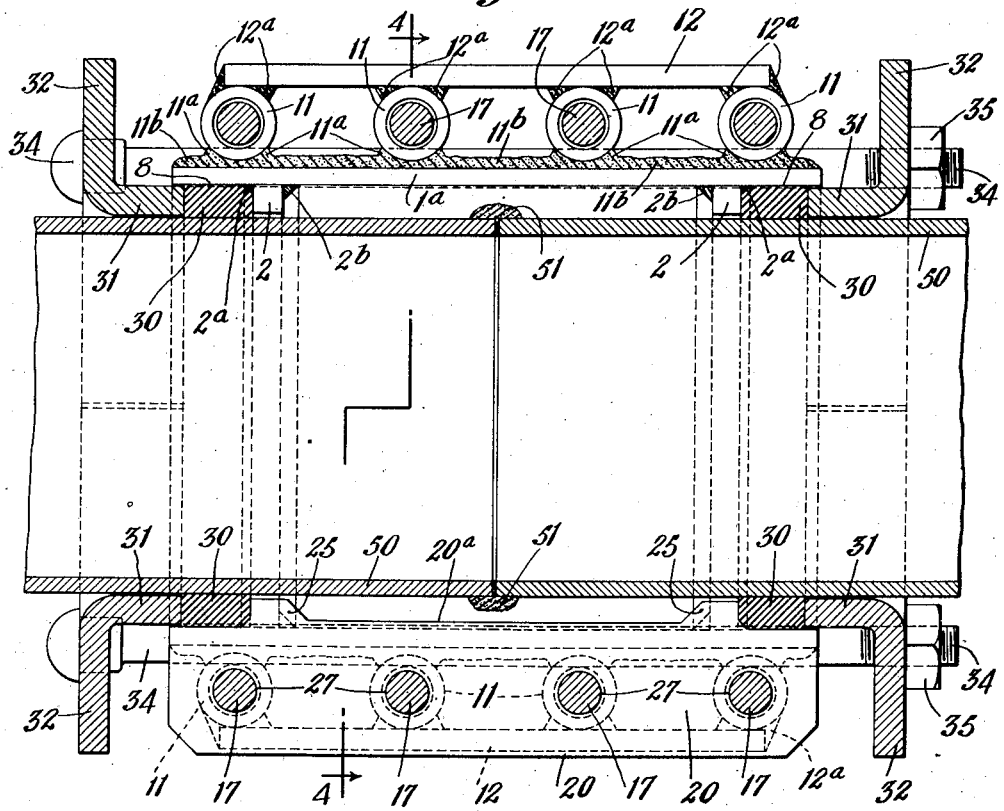
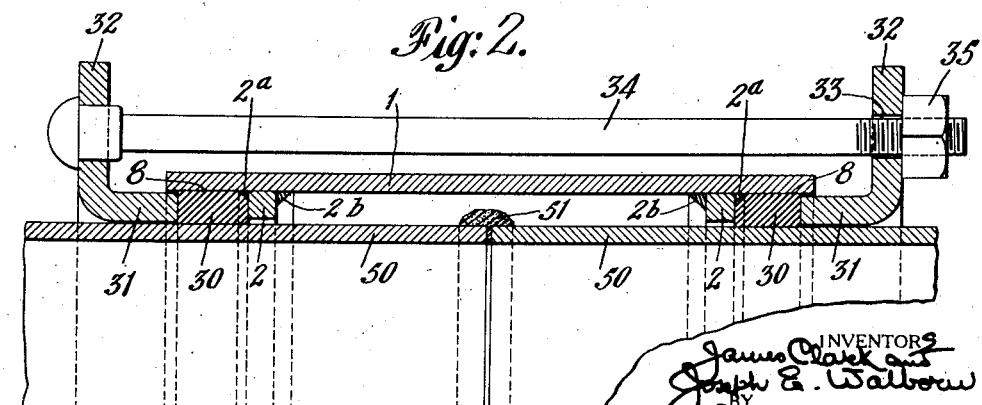

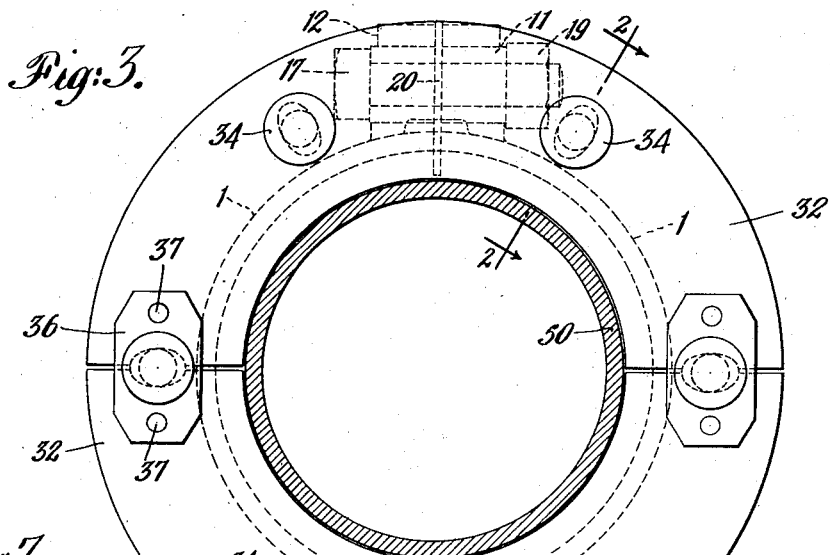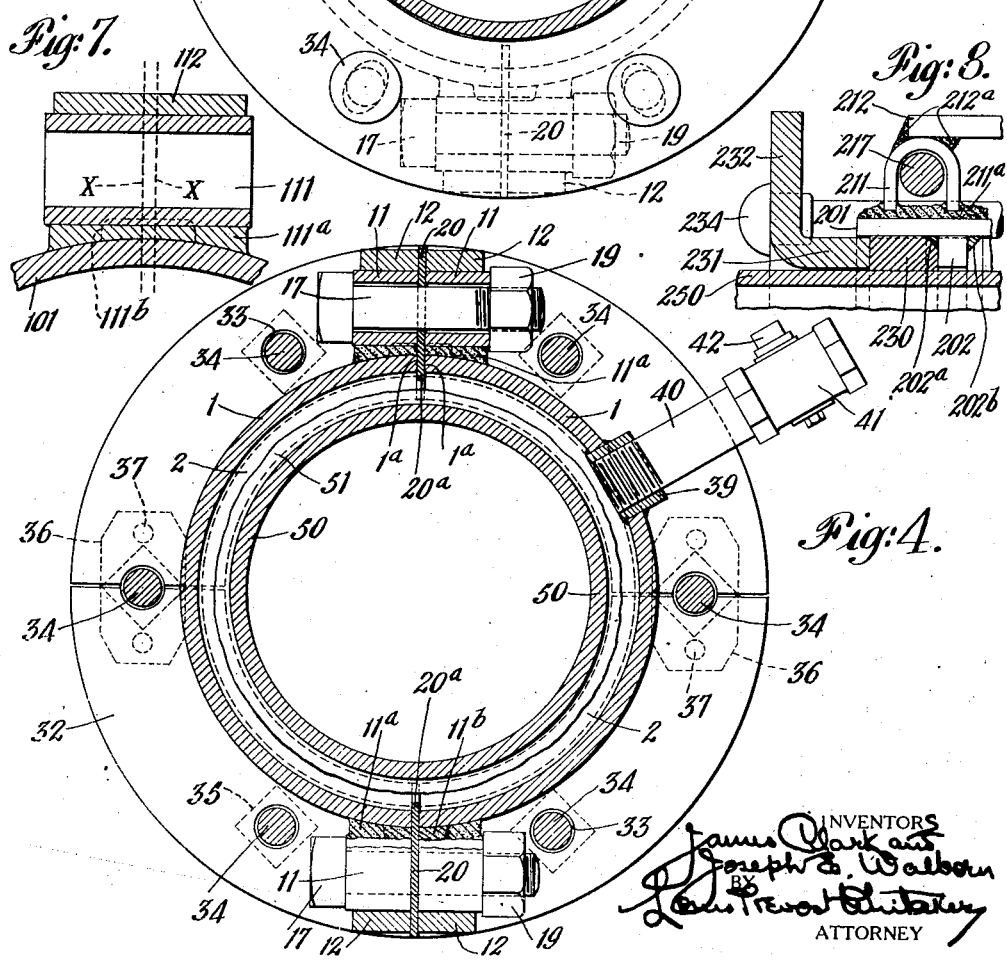

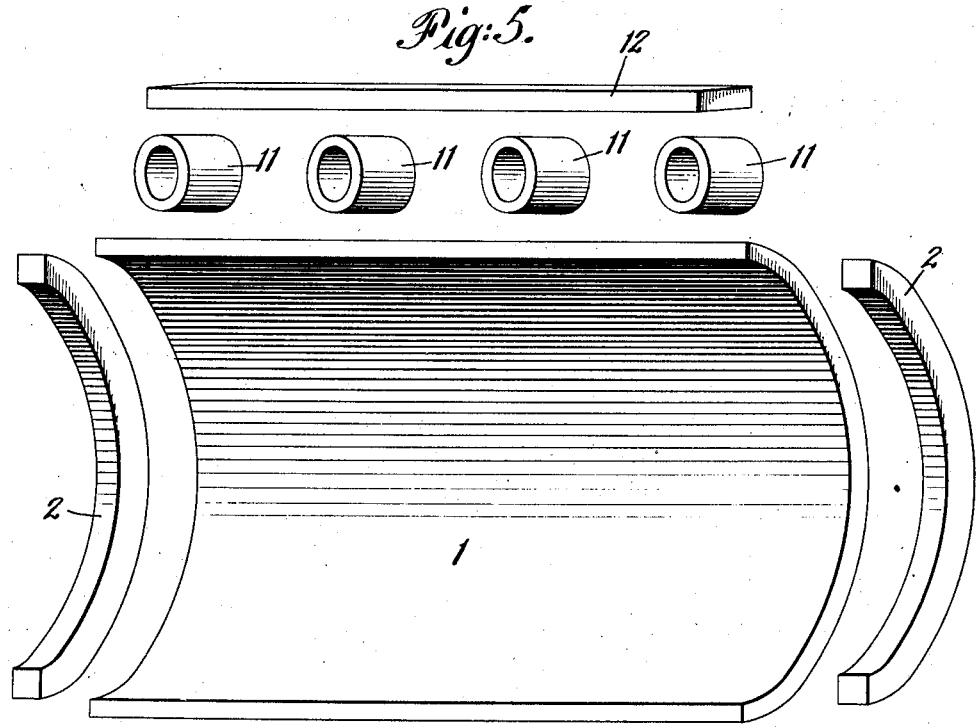
Fig:5.
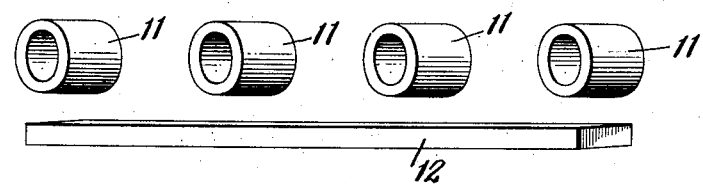
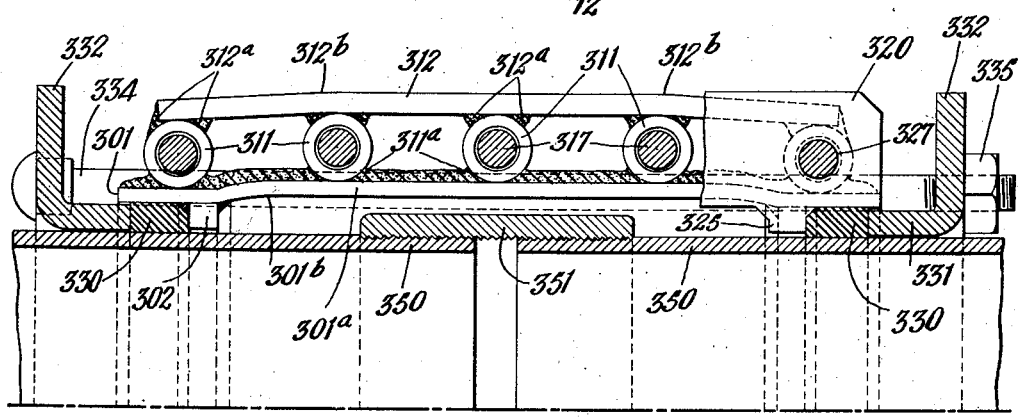
Fig:6.

Patented July 28, 1931

1,816,421

UNITED STATES PATENT OFFICE

JAMES CLARK AND JOSEPH E. WALBORN, OF BRADFORD, PENNSYLVANIA, ASSIGNORS TO S. R. DRESSER MANUFACTURING COMPANY, OF BRADFORD, PENNSYLVANIA, A CORPORATION OF PENNSYLVANIA

WROUGHT METAL REPAIR DEVICE FOR PIPE LINES

Application filed April 24, 1928. Serial No. 272,547.

Our invention consists in the novel features hereinafter described, reference being had to the accompanying drawings which show two embodiments of the invention selected by us for purposes of illustration, and the said invention is fully disclosed in the following description and claims.

Our invention is a repair device or split sleeve formed entirely of wrought metal, as iron or steel, and designed to be employed principally to stop leaks in pipe lines without necessitating the cutting off of the flow of material through the line, or disturbing the pipe sections adjacent to the leak. The repair device comprises a wrought metal sleeve composed of segmental portions, each provided adjacent to each end with inwardly extending portions forming with the marginal end portions of the segment end packing recesses, the longitudinal edges of the segments being provided exteriorly with a plurality or series of separated clamping members, having their axes disposed transversely to the axis of the sleeve and welded to the segment, preferably by use of the welding machine and welding rod. The clamping members are preferably in the form of sections of tubing, and the welding material, which unites them to the longitudinal edge portion of the segments, is carried longitudinally along the edge between the tube sections, so as to provide each segment with edges or faces of greater width than the thickness of the segment itself, to engage side packings which are employed between the meeting edges of the segments, and the segments are clamped upon the side packings by suitable means, as bolts and nuts, extending through registering tube sections of adjacent segments. In order to reinforce the tube sections forming the clamping members and prevent distortion of the segments, a reinforcing bar extending longitudinally of the sleeve is welded to the outer faces of all the tube sections in each series. We also prefer to form the end packing recesses by welding a wrought metal segment end piece to the inner face of each sleeve segment adjacent to each end thereof in the manner shown in our former Patent No. 1,568,268, granted January 5, 1926, although this is not essential to our present invention, and the repair device is completed by end packings inserted in the packing recesses and clamping rings for engaging the packings, and made in sections to enable them to be applied to the pipe, the clamping rings being connected by longitudinal bolts and nuts thereon.

By our invention, we produce an extremely light repair sleeve, which can be made very cheaply and will at the same time be thoroughly strong and efficient in use. In its present form, as hereinafter described, it will have all the advantages of the sleeve described and claimed in our former patent, as the only welded joints which are exposed to the pressure of fluid tending to escape from the pipe line are the welded joints between the interior end segments of the sleeve and the inner face of the sleeve, and when in use the end packings will be compressed in the end packing recesses in such manner as to completely seal these joints, and prevent the possibility of any leakage therethrough, hence these repair devices can be manufactured and sold without the necessity of individually testing each specimen, and all of the welding will be done with a view to secure strength without the necessity of making the welds gas-tight, which assists in reducing the cost of the device, while insuring an absolutely gas-tight construction when applied to a pipe line.

Referring to the accompanying drawings,

Fig. 1 is a vertical sectional view showing one of our repair devices applied to a pipe line, the sections of which are connected by a welded joint, the side rubber, or packing, at the upper portion of the figure being removed.

Fig. 2 is a partial sectional view of the same taken on the line 2—2 of Fig. 3.

Fig. 3 is an end view of the repair device, the adjacent pipe section being shown in section.

Fig. 4 is a transverse section on the line 4—4 of Fig. 1.

Fig. 5 is a view showing the various parts of one half of the sleeve in separated relation before they are welded together.

Fig. 6 is a partial sectional view similar to Fig. 2, showing a slightly modified construction for accommodating a screw coupling, but which can also be used with welded pipe sections.

Fig. 7 is a detail sectional view illustrating the manner of constructing the sleeve where the tubular clamping members are united to the sleeve and subsequently sawed with the sleeve after welding.

Fig. 8 is a detail view showing another slight modification.

In the embodiment of our invention shown in Figs. 1 to 5, 1—1 represents the segments of the sleeve which are formed of wrought metal, preferably steel or wrought iron, and bent or curved into the form of a segment or a cylinder. The sleeve may consist of two or more of these segments, but we find it convenient to form it of two segments. Each segment, 1, is provided adjacent to each end on its inner face with a curved segmental piece of wrought metal, 2, welded thereto at a distance back from the end of the segment, 1, preferably by the use of the welding machine and the formation of the fillets, indicated at $2^a$ and $2^b$. The inner curved faces of said segmental end pieces, 2, form the pipe opening of the sleeve, which is but slightly larger than the outside diameter of a pipe section, and end packing recesses, indicated at 8, are formed by the inwardly projecting end pieces, 2, and the inner faces of the marginal portions of the sleeve segments, to accommodate the end packing rings, indicated at 30. It will be noted that the compression of the packing rings, 30, within the end packing recesses, 8, will cause the packing to firmly engage the pipe section, indicated at 50, the inner face of the marginal end portion of the sleeve section, 1, and the outer faces of the end pieces, 2, and their fillets, $2^a$, thus not only effecting a tight joint between the sleeve and the pipe section, 50, but preventing the possibility of any leakage through the welds, by which the end pieces, 2, forming the inner ends of the packing recesses are connected to the sleeve segments. It is, therefore, immaterial whether the welds are absolutely gas-tight so long as they have the necessary strength, since any deficiency in this particular will be corrected by the end packings when the device is installed for use, and all preliminary testing of the sleeves before delivery is avoided with great saving in the cost of production.

It will be understood that the meeting longitudinal edges of the sleeve segments, indicated for example at $1^a$, will be brought together upon side packings and clamped. To this end we provide each longitudinal edge of each segment, 1, on the outer face of the segment with a plurality of tubular clamping members, 11, which are preferably formed of sections of heavy tubing and are welded at separated points, preferably on the welding machine connecting the tubular members with the sleeve segment by welding material, i. e., portions of the welding rod, for example, indicated at $11^a$. These tube sections are disposed transversely to the axis of the sleeve and have their inner faces in alignment with the longitudinal face, $1^a$, of the segment, and are welded to the sleeve throughout their length along a considerable portion of their inner faces, as clearly indicated in Figs. 1 and 4, the tube sections, 11, of the meeting edges of the sleeve segments, 1, being coaxially disposed. In order to increase the amount of surface adjacent to each edge, $1^a$, of the segment, which engages the side packing, we conveniently form a bridge, or strip, $11^b$, of welding material united with the portions, $11^a$, of welding material, and beyond and between the tube sections, 11, so that the meeting faces of the tube segments are thereby increased in width throughout their entire length beyond the thickness of the material which is indicated by the portion, $1^a$. In order to reinforce and connect the tube sections, we provide adjacent to each series thereof a reinforcing bar, 12, which is placed in engagement with the outer face of the tube sections, 11, and is welded to each of said tube sections, preferably on the electric welding machine, by the formation of two fillets, $12^a$, on opposite sides of the points of contact between the reinforcing bar and the tube sections, so that the tubular clamping members or tube sections, 11, are very rigidly connected and braced, thus stiffening the entire sleeve section and preventing distortion of its longitudinal edges when clamped upon the side packings. As illustrated in Figs. 3 and 4, the inner longitudinal edges of the reinforcing bars, 12, will be in the same plane as the inner end faces of the tube sections, so as to contact with the packing, so that the bolt strain will be very uniformly distributed on the opposite faces of the side packings from the inner face of the sleeve segments to the outer faces of the reinforcing bars, 12, see Fig. 4, so that there will be no tendency for the bolt strain to produce distortion or twisting of the parts, which would interfere with the securing of a tight longitudinal joint.

In some instances it may be found desirable to form the sleeve as a perfect cylinder and to weld thereto tube sections, indicated at 111 in Fig. 7, for example, in which the sleeve is indicated at 101, said tube sections being a little more than twice the desired length of the tubular clamping member for each segment of the sleeve, and being welded to the cylinder or sleeve, 101, as indicated at $111^a$, a reinforcing bar, 112, being welded to the outer faces of the tubular members, 111. It will be understood that the cylinder, 101, will be so provided at two points diametrically opposite each other for example, and that the cylinder will then be sawed entirely through, including the central portions of the tubular members and reinforcing plate, removing a kerf, as indicated between the dotted lines, x—x in Fig. 7, of substantially the same width as the side packings. This is a convenient way of providing the segments of the sleeve with their tubular clamping members and reinforcing plates, and of course, it insures the co-axial relation between the clamping members of the meeting edges of the segments. It will be understood that a line or strip of welding material, indicated at 111$^b$ in Fig. 7, will be run along the outer face of the cylinder, 101, at each side between the tubular clamping members and beyond them, as in Fig. 1, to provide additional width for the meeting edges of the sleeve segments. While this is a convenient method of constructing these sleeve segments, they may be made in other ways, as by forming the segments and welding the additional parts thereto in the manner previously described, and as indicated in Fig. 5.

In Fig. 1, we have shown in the lower portion of the figure one of the side packings, which is indicated at 20. The inner edge of the side packings, which is a flat strip of rubber or other suitable material, extends within the inner surface of the sleeve segments, as indicated at 20$^a$, and as portions, 25, 25, adapted to fit between the meeting ends of the interior end piece segments, 2, and their fillets, 2$^a$, 2$^b$, these inwardly projecting portions, 25, making a tight joint with the end packing rings, 30. The side packings extend out slightly beyond the end faces of the reinforcing bars, 12, and are provided with apertures, indicated at 27, for the transverse clamping bolts, 17, which are provided with the usual nuts, 19. In connection with the sleeve and end packings, we employ two followers or clamping rings, each of which is provided with a cylindrical packing engaging portion, 31, and a perpendicular clamping flange portion, 32, provided with bolt holes, 33, for the reception of longitudinally extending clamping bolts, 34, which extend from one clamping ring directly to the other, and are provided with nuts, 35. The followers are also made in two or more pieces, to facilitate placing them in position around a pipe section connected in a pipe line, and are provided with bridge pieces, 36, provided with bolts or pins, 37, to engage locking apertures in the segments of the followers in a manner similar to that illustrated in Letters Patent of the United States, granted to James Clark, No. 1,062,438, dated May 20, 1913, said bridge pieces being provided with an aperture for the clamping bolt, and the line of division between the segments of the clamping ring, or follower, passing through certain of the bolt holes therein, as described in said Letters Patent, or the bridge pieces may be bolted, riveted, or otherwise secured to the segment of the followers in any desired manner. We find it convenient, however, to secure each bridge piece to one segment of the follower, so as to facilitate the assembly of the followers around the pipe sections, and to prevent the accidental separation of the bridge pieces from the segments of the followers in transportation, but this is not essential. In order to facilitate the application of our improved repair device and prevent the leaking high pressure fluid from blowing the packings out of position and interfering with the workmen as the parts are tightened into position, we prefer to provide means for relieving the pressure within the sleeve around the leaking pipe until after the parts have been fully tightened up. In this instance one of the segments of the sleeve is shown provided with an aperture bored therein and fitted with an internally screw threaded collar, 39, to receive a nipple, 40, to which is secured a relief cock, or valve, 41, having a rotary plug valve, 42. This cock is left open during the assembling and tightening of the parts to relieve the pressure within the sleeve, and when the repair device is fully tightened up, the plug valve can be turned with a wrench to close off the vent connection. Any other form of vent valve can be employed.

In Figs. 1 to 4 inclusive, we have shown our improved repair device applied to two pipe sections, 50, which are united by welding, as indicated at 51, without the use of any coupling. This is a customary method of joining pipes at the present time and obviates threading the pipes, and also the provision of any form of coupling. Assuming that such a joint has become leaky, to apply the repair device, an excavation is made around the joint of sufficient size to permit the insertion of the repair device. The segments of the sleeve are placed around the pipe so as to enclose the leak, and provided with the side packings, the transverse bolts, 17, being inserted, and the nuts, 19, being screwed up, thus making a tight joint between the segments of the sleeve. The end packings, 30, are then placed around the pipe sections and inserted in the end packing recesses. These packings are usually made in a ring form and cut on a bevel to permit them to be placed in position around the pipe. The followers are then placed around the pipe sections and assembled by means of their respective bridge pieces. The through bolts, 34, are then passed through registering bolt holes in the followers, and the nuts, 35, are drawn up to compress the packings, 30, and squeeze the end packing rings, preferably of rubber, against the end pieces, 2, and their fillets, 2$^a$, thus making perfectly gas-tight joints at each end of the sleeve, and preventing any possible leakage where the end pieces, 2, are welded to the interior of the sleeve sections, and also making gas-tight joints in contact with the edges of the side packings between the sections of the sleeve. Where the sleeve is provided with a vent aperture and valve, as before described, the valve will be left open to relieve the interior pressure until the repair device is completely assembled and tightened, but the provision of such a vent valve is not absolutely necessary, and it may be dispensed with, or the vent aperture, if provided, may be closed by an ordinary plug.

In the form of the invention shown in Figs. 1 to 5, it will be noted that all the parts are of wrought metal, and as such are impervious and much lighter than cast metal of the same strength. The sleeve can be made as a true cylinder, where as in this form it is to be used with welded pipe joints, so that the sleeve even for pipes of considerable diameter is less than half the width of the usual cast iron sleeve, facilitating transportation and installation, especially in points of difficult access where these sleeves must frequently be installed in pipe lines extending for hundreds of miles across country. The parts of the sleeve can be formed and united by welding in any preferred manner, and the fact that it is only necessary to weld for strength and not for gas-tightness, and further, that all preliminary pressure tests before delivery are dispensed with, the repair device can be very cheaply made. We do not desire to be limited to the use of clamping members in the form of sections of a tube, as this is not necessary as the clamping members might be in the form of an inverted U for example, or other form and welded to the sleeve segments and reinforcing bar for example, as indicated in Fig. 8, in which the parts are given the same reference characters as in Fig. 1, with the addition of 200. We prefer, however, to employ sections of tubes which can be conveniently sawed off from the stock of the required diameter, as being very cheap and convenient means of supplying these parts of the device.

We prefer to form the sleeve in two segments as shown, but it is obvious that it could be made of a larger number of segments, if desired.

In Fig. 6 we have shown a slight modification of our invention, which is adapted for use with pipe sections, which are united by couplings. In this figure the parts corresponding with those shown in Figs. 1 to 4, are given the same reference characters with the addition of 300. In this figure we have shown two pipe sections, 350, having their ends threaded and united by a threaded coupling, 351. The construction of the repair device is exactly the same as that previously described, except that the sleeve segments, one of which is indicated at 301, is provided with an outwardly bowed portion, 301$^b$, to increase the diameter of the central portion of the sleeve between the segmental end pieces, 302, to accommodate the coupling. In this construction the exterior reinforcing bar, 312, will obviously be bent, as indicated at 312$^b$, to have it conform with the contour of the sleeve segment, and the side packings, 320, will have their contours slightly changed to conform to this variation in the structure of the sleeve segments, but without in any way altering the operation of the parts. Obviously the form of repair device illustrated in Fig. 6 could be used also with welded pipe sections.

What we claim and desire to secure by Letters Patent is:—

1. As a new article of manufacture a split sleeve for repairing pipe lines, comprising among its members a plurality of sleeve segments formed of wrought metal, and provided at each end with packing engaging portions, each segment being provided adjacent to each longitudinal edge thereof with a longitudinal series of separately formed clamping members welded thereto, and each provided with a single bolt aperture having its axis disposed transversely of the longitudinal edges of said sleeve segments.

2. As a new article of manufacture a split sleeve for repairing pipe lines, comprising among its members a plurality of sleeve segments formed of wrought metal, and provided at each end with packing engaging portions, each segment being provided adjacent to each longitudinal edge thereof with a series of separately formed clamping members welded thereto, and provided with bolt apertures having their axes disposed transversely of the longitudinal edges of said sleeve segments, and a separately formed reinforcing bar welded to the outer surface of each of said clamping members of each series.

3. As a new article of manufacture a split sleeve for repairing pipe lines, comprising among its members a plurality of sleeve segments formed of wrought metal, and provided at each end with packing engaging portions, each segment being provided adjacent to each longitudinal edge thereof with a series of separately formed tube sections welded thereto and having their axes disposed transversely of the longitudinal edges of said segments, tube sections adjacent to the meeting edges of the sleeve segments being in registration.

4. As a new article of manufacture a split sleeve for repairing pipe lines, comprising among its members a plurality of sleeve segments formed of wrought metal, and provided at each end with packing engaging portions, each segment being provided adjacent to each longitudinal edge thereof with a series of separately formed tube sections welded thereto and having their axes disposed transversely of the longitudinal edges of said segments, tube sections adjacent to the meeting edges of the sleeve segments being in registration, and a separately formed reinforcing bar welded to the outer surface of each of the tube sections of each series.

5. As a new article of manufacture, a split sleeve for repairing pipe lines comprising among its members, a plurality of sleeve segments formed of wrought metal, and provided at each end with packing engaging portions, each segment being provided adjacent to each longitudinal edge thereof with a series of separately formed clamping members welded thereto, and each provided with a single bolt aperture having its inner axis disposed transversely of the longitudinal edges of said sleeve segments, each of said edges being provided on its exterior surface with metal portions extending continuously along said edge and flush therewith, and welded to the segment throughout its length and at intervals to said clamping members.

In testimony whereof we affix our signatures.

JAMES CLARK.
JOSEPH E. WALBORN.